(12) United States Patent
Kagawa et al.

(10) Patent No.: US 9,046,173 B2
(45) Date of Patent: Jun. 2, 2015

(54) TRANSMISSION DRIVING DEVICE

(75) Inventors: Hiroki Kagawa, Kashiba (JP); Yasuhiro Yukitake, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 351 days.

(21) Appl. No.: 13/636,876

(22) PCT Filed: Mar. 22, 2011

(86) PCT No.: PCT/JP2011/056736
§ 371 (c)(1),
(2), (4) Date: Sep. 24, 2012

(87) PCT Pub. No.: WO2011/118553
PCT Pub. Date: Sep. 29, 2011

(65) Prior Publication Data
US 2013/0008279 A1 Jan. 10, 2013

(30) Foreign Application Priority Data

Mar. 24, 2010 (JP) ................................. 2010-067990

(51) Int. Cl.
*B60K 20/00* (2006.01)
*G05G 9/00* (2006.01)
*F16H 61/32* (2006.01)
*F16H 61/28* (2006.01)

(52) U.S. Cl.
CPC ............. *F16H 61/32* (2013.01); *Y10T 74/2003* (2015.01); *F16H 2061/2838* (2013.01)

(58) Field of Classification Search
USPC .......... 74/335, 473.1, 473.12, 473.36, 473.37
See application file for complete search history.

(56) References Cited

U.S. PATENT DOCUMENTS

| | | | |
|---|---|---|---|
| 5,219,391 A | 6/1993 | Edelen et al. | |
| 5,689,997 A | 11/1997 | Schaller | |
| 5,802,915 A | 9/1998 | Organek et al. | |
| 5,823,053 A | 10/1998 | Stengel et al. | |
| 6,230,577 B1 * | 5/2001 | Showalter et al. | 74/337.5 |
| 6,334,371 B1 | 1/2002 | Stengel et al. | |
| 7,231,844 B2 * | 6/2007 | Yasui et al. | 74/335 |
| 7,350,433 B2 * | 4/2008 | Yasui et al. | 74/335 |

(Continued)

FOREIGN PATENT DOCUMENTS

| | | |
|---|---|---|
| CN | 1180145 A | 4/1998 |
| DE | 195 27 893 C1 | 10/1996 |

(Continued)

OTHER PUBLICATIONS

International Search Report issued in International Patent Application No. PCT/JP2011/056736 dated Jun. 28, 2011.

*Primary Examiner* — Justin Krause
(74) *Attorney, Agent, or Firm* — Oliff PLC

(57) ABSTRACT

A transmission driving device that is capable of preventing displacement of a shift operation member or a select operation member in a case where there is reverse input in the shift operation member or the select operation member by inhibiting rotation of a rotation member which is released from an input shaft. When an input shaft and a first rotor are connected, the first electromagnetic coil is an excitation state and a second electromagnetic coil is in a non-excitation state. In this state, a second magnetic ring is not attracted to the side of the second electromagnetic coil, a seventh facing, which is fixed to the second magnetic ring, and an eighth facing are engaged with each other, and a second rotor and a casing are connected to each other. In a connection state of the second rotor and the casing, the second rotor cannot be rotated.

10 Claims, 8 Drawing Sheets

(56) References Cited

U.S. PATENT DOCUMENTS

2012/0144942 A1 6/2012 Yukitake et al.
2012/0318089 A1* 12/2012 Uemoto .................... 74/473.12

FOREIGN PATENT DOCUMENTS

| | | |
|---|---|---|
| EP | 0 545 597 A1 | 6/1993 |
| EP | 0 757 193 A1 | 2/1997 |
| EP | 0 809 049 A1 | 11/1997 |
| JP | A-63-30637 | 2/1988 |
| JP | A-5-256362 | 10/1993 |
| JP | A-9-112688 | 5/1997 |
| JP | A-10-122361 | 5/1998 |
| JP | A-2003-74697 | 3/2003 |
| WO | WO 2005/057051 A1 | 6/2005 |

* cited by examiner

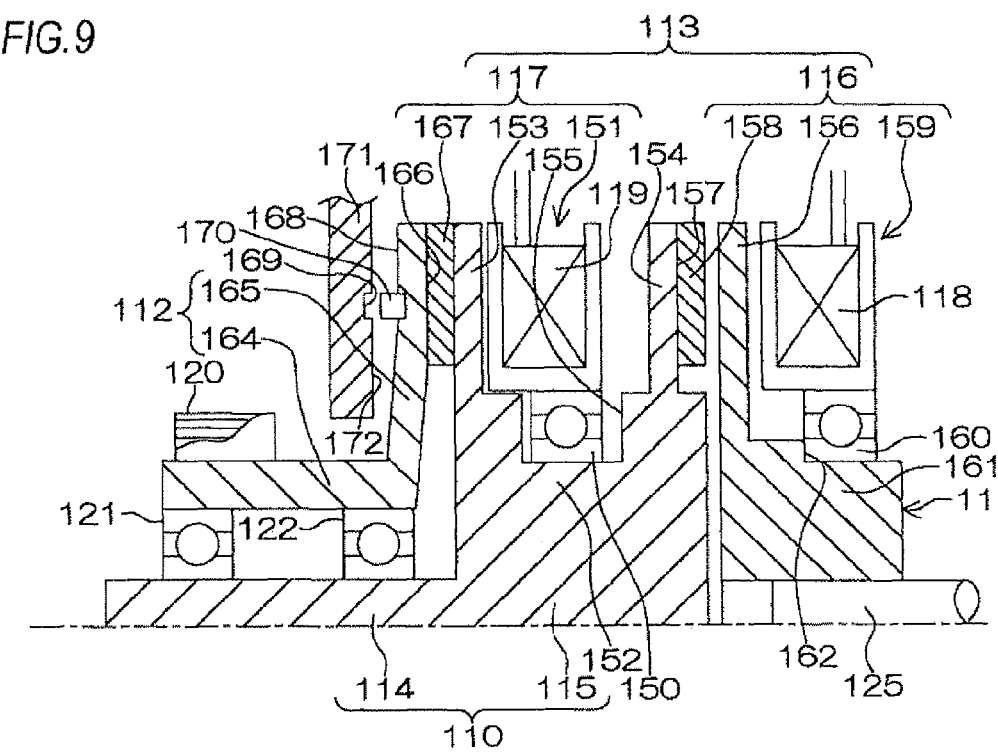

TRANSMISSION DRIVING DEVICE

TECHNICAL FIELD

The present invention relates to a transmission driving device.

BACKGROUND ART

Conventionally, a transmission driving device of an automated control manual transmission (Automated Manual Transmission) in which a manual transmission clutch is automated has been known.

For example, in a transmission driving device of PTL 1, two motors such as a motor for a shift operation and a motor for a select operation are provided, and an operation similar to a manual operation is performed using these motors.

CITATION LIST

Patent Literature

[PTL 1] JP-A-63-30637

SUMMARY OF INVENTION

Technical Problem

In PTL 1, since two electric motors are used, there is a concern that costs will be increased.

Therefore, the inventors have considered using a single electric motor to realize both a shift operation and a select operation. For example, a clutch mechanism can be adopted in order to selectively transmit the rotating torque of the electric motor to one of a shift operation member for the shift operation or a select operation member for the select operation. The clutch mechanism includes a first electromagnetic clutch that connects a first rotation member, which is connected to the shift operation member, to an input shaft, and releases the first rotation member from the input shaft, and a second electromagnetic clutch that connects a second rotation member, which is connected to the select operation member, to the input shaft, and releases the second rotation member from the input shaft. When the first electromagnetic clutch is in an excitation state, the second electromagnetic clutch is set to be in a non-excitation state, and when the second electromagnetic clutch is in an excitation state, the first electromagnetic clutch is set to be in a non-excitation state.

When the first electromagnetic clutch is connected, the second rotation member is released from the input shaft. In this case, if there is reverse input in the select operation member, the second rotation member is rotated, and there is a concern that the select operation member may be operated (moved) regardless of the control of a controller. In addition, similarly, if there is reverse input in the shift operation member in a state where the first rotation member is released from the input shaft, the first rotation member is rotated, and there is a concern that the shift operation member may be operated (moved) regardless of the control of the controller.

Therefore, an object of the present invention is to provide a transmission driving device capable of preventing displacement of the shift operation member or the select operation member in a case where there is a reverse input in the shift operation member or the select operation member by inhibiting rotation of the rotation member which is released from the input shaft.

Solution to Problem

According to a first aspect of the present invention, there is provided a transmission driving device (1; 100) comprising: a casing (5; 107); a shift operation member (8; 101) which is configured to perform a shift operation; a select operation member (12; 101) which is configured to perform a select operation; an input shaft (30; 110) to which a rotating torque of an electric motor (9; 103) is to be input; a first rotation member (31; 112) which is configured to transmit the rotating torque to one of the shift operation member and the select operation member; a second rotation member (32; 111) which is configured to transmit the rotating torque to the other of the shift operation member and the select operation member; a clutch mechanism (33; 113) which includes: a first clutch (34; 117) that is configured to connect the first rotation member to the input shaft and that is configured to release the first rotation member from the input shaft; and a second clutch (35; 116) that is configured to connect the second rotation member to the input shaft and that is configured to release the second rotation member from the input shaft, the clutch mechanism which is configured to selectively transmit the rotating torque of the input shaft to the first rotation member or the second rotation member; a casing side engagement portion (60, 75; 169) which is provided on the casing or which is provided on a fixing member (171) that is provided to be fixed to the casing; and a first engagement portion (56; 170) which is integrally and rotatably provided in the first rotation member, and which can be engaged with the casing side engagement portion, wherein the first clutch is configured of an electromagnetic clutch that includes a first electromagnetic coil (36; 119), and the first engagement portion is attracted to a side of the first electromagnetic coil and the first engagement portion is engaged with the casing side engagement portion in a non-excitation state of the first electromagnetic coil in the first clutch, and an engagement between the first engagement portion and the casing side engagement portion is released in an excitation state of the first electromagnetic coil.

In addition, the reference numerals in brackets indicate the corresponding components or the like in embodiments described below. However, the claims are not limited to the embodiments. Hereinafter, this point is similarly applied.

According to this configuration, the first engagement portion that can be engaged with the casing side engagement portion is provided so as to be integrally rotated with the first rotation member. In the non-excitation state of the first electromagnetic coil, the first engagement portion is engaged with the casing side engagement portion. Moreover, in the excitation state of the first electromagnetic coil, the first engagement portion is attracted to the first electromagnetic coil, and the engagement between the first engagement portion and the casing side engagement portion is released.

When the input shaft and the first rotation member are connected to each other, since the first electromagnetic coil of the first clutch is in the excitation state, the engagement between the first engagement portion and the casing side engagement portion is released. That is, the first rotation member is released from the casing. Thereby, if the rotating torque is transmitted from the input shaft to the first rotation member, the first rotation member is integrally rotated with the input shaft.

On the other hand, when the input shaft and the second rotation member are connected to each other, since the first electromagnetic coil of the first clutch is in the non-excitation state, the first engagement portion and the casing side engagement portion are engaged with each other, and the first rotation member is connected to the casing. In the connection state of the first rotation member and the casing, the first rotation member cannot be rotated. Therefore, the first rotation member, which is in the state in which the first rotation member is released from the input shaft, cannot be rotated, and thereby, in a case where there is reverse input in the shift operation member or the select operation member, displacement (movement or rotation) of the operation member can be prevented.

Moreover, since the connection and the release of the first rotation member with respect to the casing are performed using the first electromagnetic coil of the first clutch, it is not necessary to provide a dedicated magnetic circuit for performing the connection and the release of the first rotation member with respect to the casing, and thereby, reduction in the costs can be improved.

According to a transmission driving device of a second aspect of the present invention, the transmission driving device may further comprise a magnetic ring (55, 70) which can be integrally rotated with the first rotation member and which is disposed so as to be moved in an axial direction between the first electromagnetic coil and the casing side engagement portion, and the first engagement portion may be provided so as to be integrally moved with the magnetic ring.

According to this configuration, the magnetic ring is disposed between the first electromagnetic coil and the casing side engagement portion. That is, the first electromagnetic coil is disposed at a side opposite to the casing side engagement portion with respect to the magnetic ring.

In the non-excitation state of the first electromagnetic coil, the magnetic ring is not attracted to the side of the first electromagnetic coil, and thereby, the first engagement portion is not moved. Therefore, an engagement state between the first engagement portion and the casing side engagement portion is held. That is, the first rotation member is connected to the casing.

On the other hand, in the excitation state of the first electromagnetic coil, the magnetic ring is attracted to the side of the first electromagnetic coil and is moved to the side of the first electromagnetic coil. Therefore, the first engagement portion, which is provided so as to be integrally moved with the magnetic ring, is moved in a direction separated from the casing side engagement portion. Thereby, the engagement between the first engagement portion and the casing side engagement portion is released, and the first rotation member is released from the casing. Therefore, the connection and the release between the first rotation member and the casing can be switched by a relatively simple configuration.

According to a transmission driving device of third aspect of the present invention, the first clutch may further include an armature (167) that is provided so as to be integrally rotated with the first rotation member between the first electromagnetic coil and the casing side engagement portion, in the excitation state of the first electromagnetic coil, the armature is attracted to the side of the first electromagnetic coil, the armature is engaged with the input shaft, and thereby, the first rotation member and the input shaft may be connected to each other, and, in the non-excitation state of the first electromagnetic coil, an engagement between the armature and the first rotation member is released, and thereby, the first rotation member may be released from the input shaft, and the first engagement portion may be provided so as to be integrally moved with the armature.

According to this configuration, the first electromagnetic coil is disposed at a side opposite to the casing side engagement portion with respect to the armature. The first engagement portion can be integrally moved with the armature.

In the non-excitation state of the first electromagnetic coil, since the armature is not attracted to the side of the first electromagnetic coil, the armature is not engaged with the input shaft. Moreover, since the attraction of the armature is not generated, the first engagement portion is not moved, the engagement state between the first engagement portion and the casing side engagement portion is held. Therefore, in this state, the first rotation member is released from the input shaft and is connected to the casing.

On the other hand, in the excitation state of the first electromagnetic coil, the armature is attracted to the side of the first electromagnetic coil, is moved to the side of the first electromagnetic coil, and is engaged with the input shaft. Moreover, the first engagement portion, which is provided so as to be integrally moved with armature, is moved in the direction separated from the casing side engagement portion, and thereby, the engagement between the first engagement portion and the casing side engagement portion is released. Therefore, in the excitation state, the first rotation member is released from the casing and is connected to the input shaft. Thereby, the connection and the release of the first rotation member with respect to the casing can be switched by a relatively simple configuration.

In addition, the first engagement portion is provided so as to be integrally moved with the armature. Thereby, it is not necessary to separately provide a member for connecting the casing, and the reduction in the costs can be further improved.

According to a fourth aspect of the present invention, the first engagement portion may include a frictional portion (56) that is frictionally engaged with the casing side engagement portion. In this case, the frictional portion may be formed in an annular shape. In this configuration, the casing side engagement portion and the first engagement portion can be engaged with each other regardless of the rotation posture of the first rotation member with respect to the input shaft. Thereby, the mutual rotation posture in the connection state of the input shaft and the first rotation member is not limited.

In addition, according to a fifth aspect of the present invention, the first engagement portion may include an engagement piece (170) or an engagement recess that is locked and engaged with the casing side engagement portion. In this case, the casing side engagement portion and the first engagement portion can be securely engaged with each other. Thereby, the rotation of the first rotation member at the time of the release of the first clutch can be more reliably prevented. Moreover, the engagement recess may be configured of a groove or a hole.

According to a transmission driving device of a sixth aspect of the present invention, the transmission driving device may further comprise a second engagement portion (71) that can be engaged with the casing side engagement portion, the second clutch may be configured of an electromagnetic clutch that includes a second electromagnetic coil (37), the second engagement portion is attracted to a side of the second electromagnetic coil and the second engagement portion may be engaged with the casing side engagement portion in a non-excitation state of the second electromagnetic coil in the second clutch, and an engagement between the second engagement portion and the casing side engagement portion may be released in an excitation state of the second electromagnetic coil.

According to this configuration, the second engagement portion that can be engaged with the casing side engagement portion is provided so as to be integrally rotated with the second rotation member. In the non-excitation state of the second electromagnetic coil, the second engagement portion is engaged with the casing side engagement portion. Moreover, in the excitation state of the second electromagnetic coil, the second engagement portion is attracted to the second electromagnetic coil, and the engagement between the second engagement portion and the casing side engagement portion is released.

When the input shaft and the first rotation member are connected to each other, since the second electromagnetic coil of the second clutch is in the non-excitation state, the second engagement portion and the casing side engagement portion are engaged with each other, and the second rotation member is connected to the casing. In the connection state of the second rotation member and the casing, the second rotation member cannot be rotated.

Moreover, when the input shaft and the second rotation member are connected to each other, since the second electromagnetic coil of the second clutch is in the excitation state, the engagement between the second engagement portion and the casing side engagement portion is released. That is, the second rotation member is released from the casing. Therefore, if the rotating torque is transmitted from the input shaft to the second rotation member, the second rotation member is integrally rotated with the input shaft.

Thereby, both the first and second rotation members cannot be rotated at the release state from the input shaft. Therefore, in a case where there is reverse input in the shift operation member or the select operation member, displacement (movement or rotation) of the operation member can be prevented.

BRIEF DESCRIPTION OF DRAWINGS

FIG. 9 is an enlarged cross-sectional view showing configurations of the first transmission shaft, the first rotor, the second rotor, and the clutch mechanism when the first transmission shaft and the first rotor are connected to each other.

DESCRIPTION OF EMBODIMENTS

Figure 1:
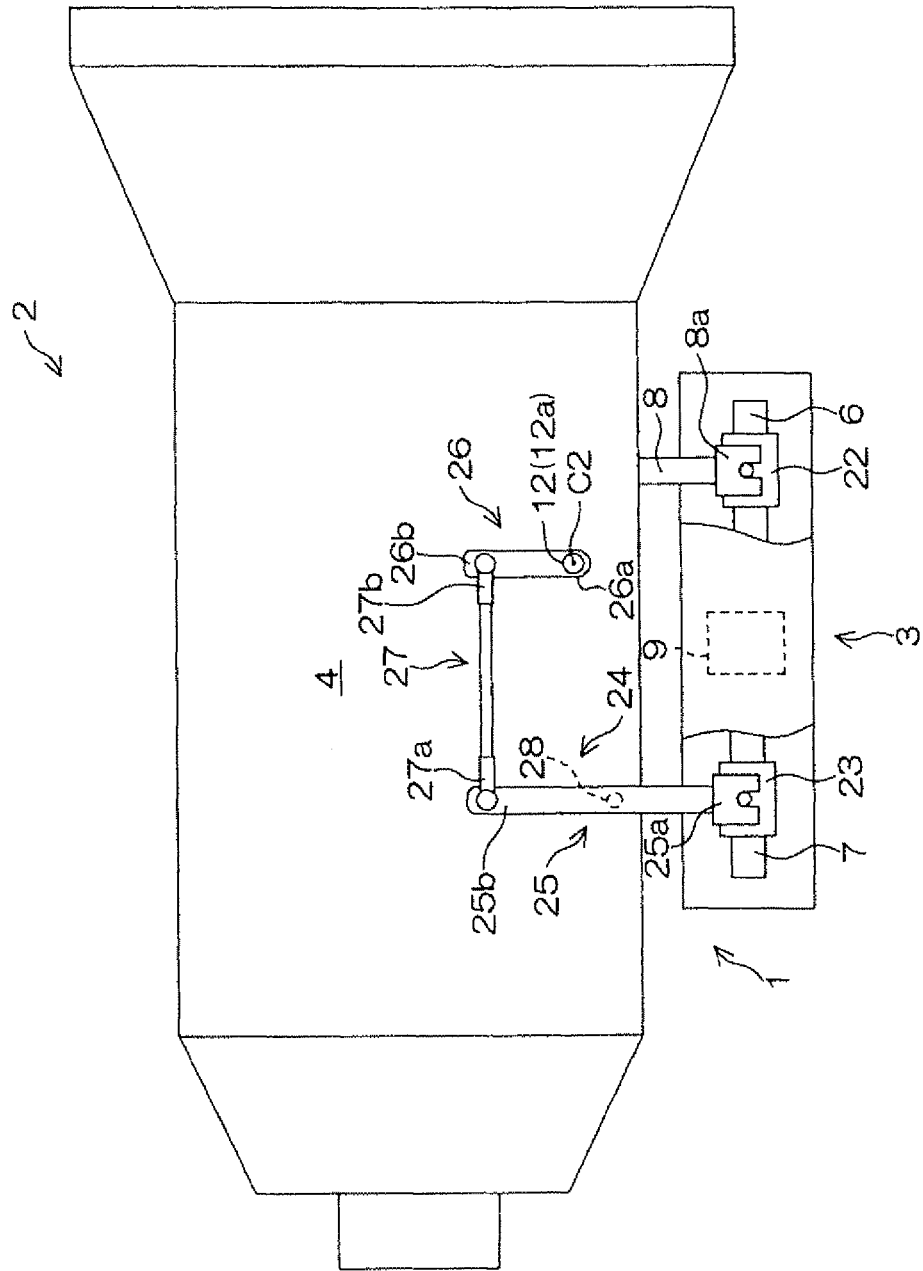
FIG. 1 is a view showing a schematic configuration of a transmission in which a transmission driving device according to an embodiment (first embodiment) of the present invention is incorporated.
Figure 2:
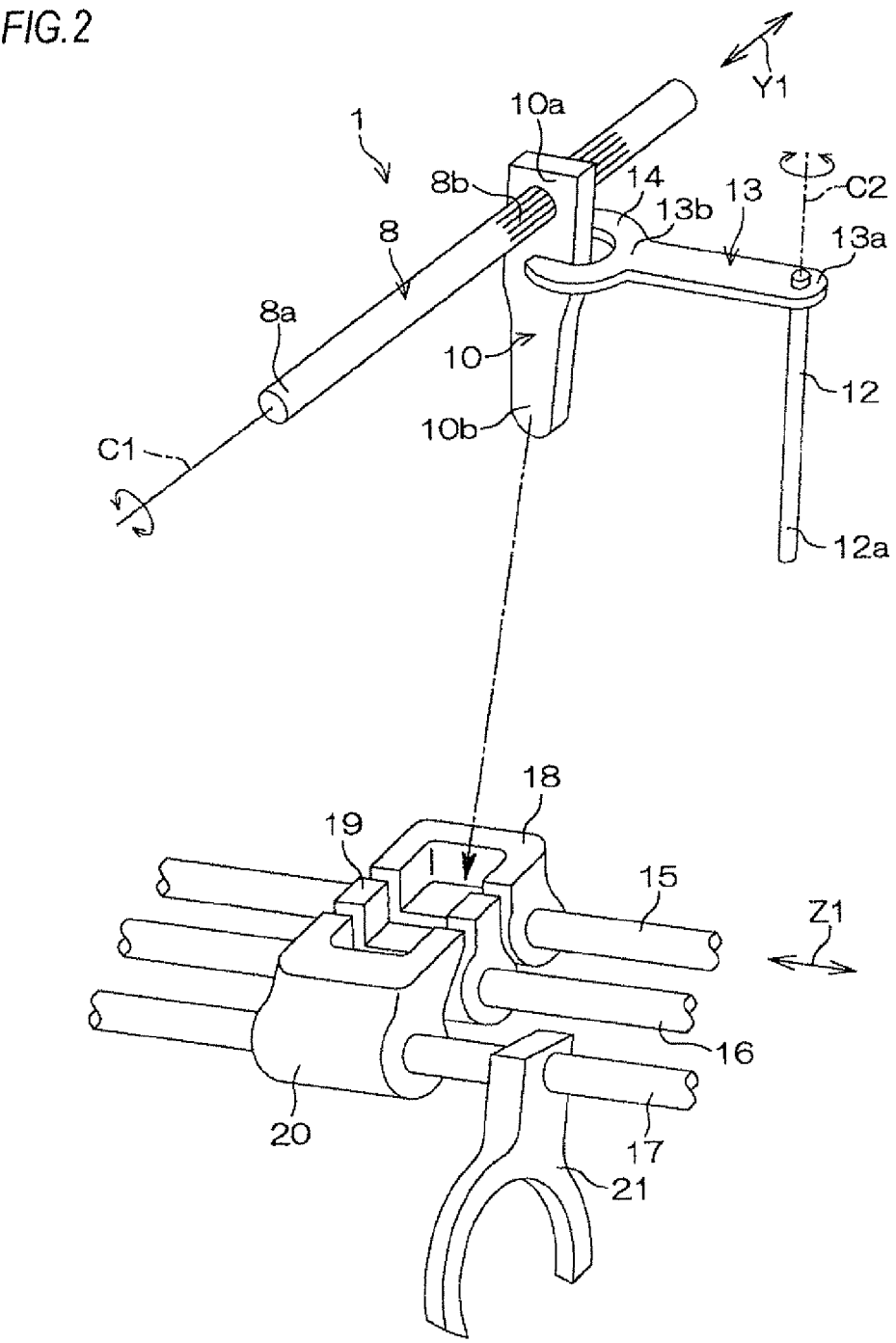
FIG. 2 is an exploded perspective view showing a schematic configuration of the transmission driving device shown in FIG. 1.

Hereinafter, an embodiment of the present invention will be described in detail with reference to the drawings. FIG. 1 is a view showing a schematic configuration of a transmission 2 in which a transmission driving device 1 according to an embodiment (first embodiment) of the present invention is incorporated. FIG. 2 is an exploded perspective view showing a schematic configuration of the transmission driving device 1.

The transmission 2 is a known parallel gear type transmission (not shown) and is installed in a vehicle such as a car or a truck. The transmission 2 includes a gear housing 4, a parallel gear type shifting mechanism (not shown) that is accommodated in the gear housing 4, and the transmission driving device 1 for driving the shifting mechanism. The transmission driving device 1 includes a shift shaft (shift operation member) 8 that causes the shifting mechanism to perform the shift operation, a select shaft (select operation member) 12 that causes the shifting mechanism to perform the select operation, and an electrical actuator 3 that is used as a common drive source for driving the shift shaft 8 and the select shaft 12.

One end 10a of an internal lever 10 that is accommodated in the gear housing 4 is supported to a middle portion of the shift shaft 8 so as to be rotated along with the shift shaft and to be moved in an axial direction Y1 of the shift shaft 8. Specifically, a male spline 8b of the shift shaft 8 is fitted to a female spline of the inner circumference of a spline hole that is provided at the one end 10a of the internal lever 10. The internal lever 10 is rotated along with the shift shaft 8 around a center axis line C1 of the shift shaft 8. One end 8a of the shift shaft 8 protrudes outside the gear housing 4.

The select shaft 12 extends along a direction that is approximately perpendicular to the shift shaft 8. One end of the select shaft 12 is connected to one end 13a of a select fork 13. Thereby, the select fork 13 can be rotated along with the select shaft 12 around a center axis line C2 of the select shaft 12. A two-pronged fork 14 that is engaged with the internal lever is provided at the other end 13b of the select fork 13. The other end 12a of the select shaft 12 protrudes outside the gear housing 4.

A plurality of shift rods 15, 16, and 17 that are parallel to one another are accommodated in the gear housing 4. Shift blocks 18, 19, and 20 engaged with the other end 10b of the internal lever 10 are fixed to each of the shift rods 15, 16, and 17. In addition, a shift fork 21 that is engaged with a clutch sleeve (not shown) is provided at each shift rod (In FIG. 2, only shift fork 21 that is provided at the shift rod 17 is shown).

The electrical actuator 3 is provided outside the gear housing 4 and includes a cylindrical casing 5, a first output shaft 6 that is accommodated in the casing 5, and a second output shaft 7. The electrical actuator 3 is fixed to the outer surface of the gear housing 4 or a predetermined place of a vehicle. The electrical actuator includes an electric motor 9 that selectively outputs rotating torque with respect to the first output shaft 6 or the second output shaft 7. The first output shaft 6 and the second output shaft 7 are coaxially disposed and are provided so as to be rotated independently to each other.

The first output shaft 6 is configured of a screw shaft and a first nut 22 is mounted on the first output shaft 6 via balls (not shown). The first output shaft 6 and the first nut 22 function as a ball screw mechanism. The second output shaft 7 is configured of a screw shaft and a second nut 23 is mounted on the second output shaft 7 via balls (not shown). The second output shaft 7 and the second nut 23 function as a ball screw mechanism. The one end 8a of the shift shaft 8 penetrates the casing 5 and is connected to the first nut 22.

Moreover, the other end 12a of the select shaft 12 is connected to a second nut 23 that is mounted on the second output shaft 7 via a link mechanism 24. The rotating torque of the second output shaft 7 is transmitted to the select shaft 12 through the link mechanism 24. The link mechanism 24 includes a first link arm 25 that includes a first end 25*a* and a second end 25*b*, a second link arm 26 that includes a third end 26*a* and a fourth end 26*b*, and a third link arm 27 that includes a fifth end 27*a* and a sixth end 27*b*.

The first end 25*a* penetrates the casing 5 and is rotatably connected to the second nut 23. Moreover, the first end is rotatably supported through the first link arm 25. The first link arm 25 can swing around a supporting point 28. The third end 26*a* is connected and fixed to the other end 12*a* of the select shaft 12. Thereby, the second link arm 26 is rotated along with the select shaft 12 around the center axis line C2. The third link arm 27 connects the second end 25*b* and the fourth end 26*b*. Specifically, the fifth end 27*a* is connected to the second end 25*b*, and the sixth end 27*b* is connected to the fourth end 26*b*. Since the third link arm 27 connects the opened ends, the third link arm can change a posture with respect to the first and second link arms 25 and 26. If the first link arm 25 swings around the supporting point 28, the second link arm 26 is swung in association with the swing operation of the first link arm, and thereby, the select shaft 12 is rotated around the center axis line C2.

If the second output shaft 7 of the electric actuator 3 is rotated, according to this, the second output shaft 7 and the select fork 13 swing around the center axis line C2 of the select shaft 12. Thereby, the fork 14 of the other end of the select fork 13 causes the internal lever 10 to be moved in the axial direction Y1 of the shift shaft 8. As a result, the other end 10*b* of the inter lever 10 is engaged with desired shift blocks 18, 19, and 20, and thereby, the select operation is achieved.

On the other hand, if the first output shaft 6 of the electrical actuator 3 is rotated, according to this, the shift shaft 8 and the internal lever 10 swing around the center axis line C1 of the shift shaft 8. As a result, the shift blocks 18, 19, and 20 which are respectively engaged with the internal lever 10 are moved in an axial direction Z1 of the shift rods 15, 16, and 17, and thereby, the shift operation is achieved.

Figure 3:
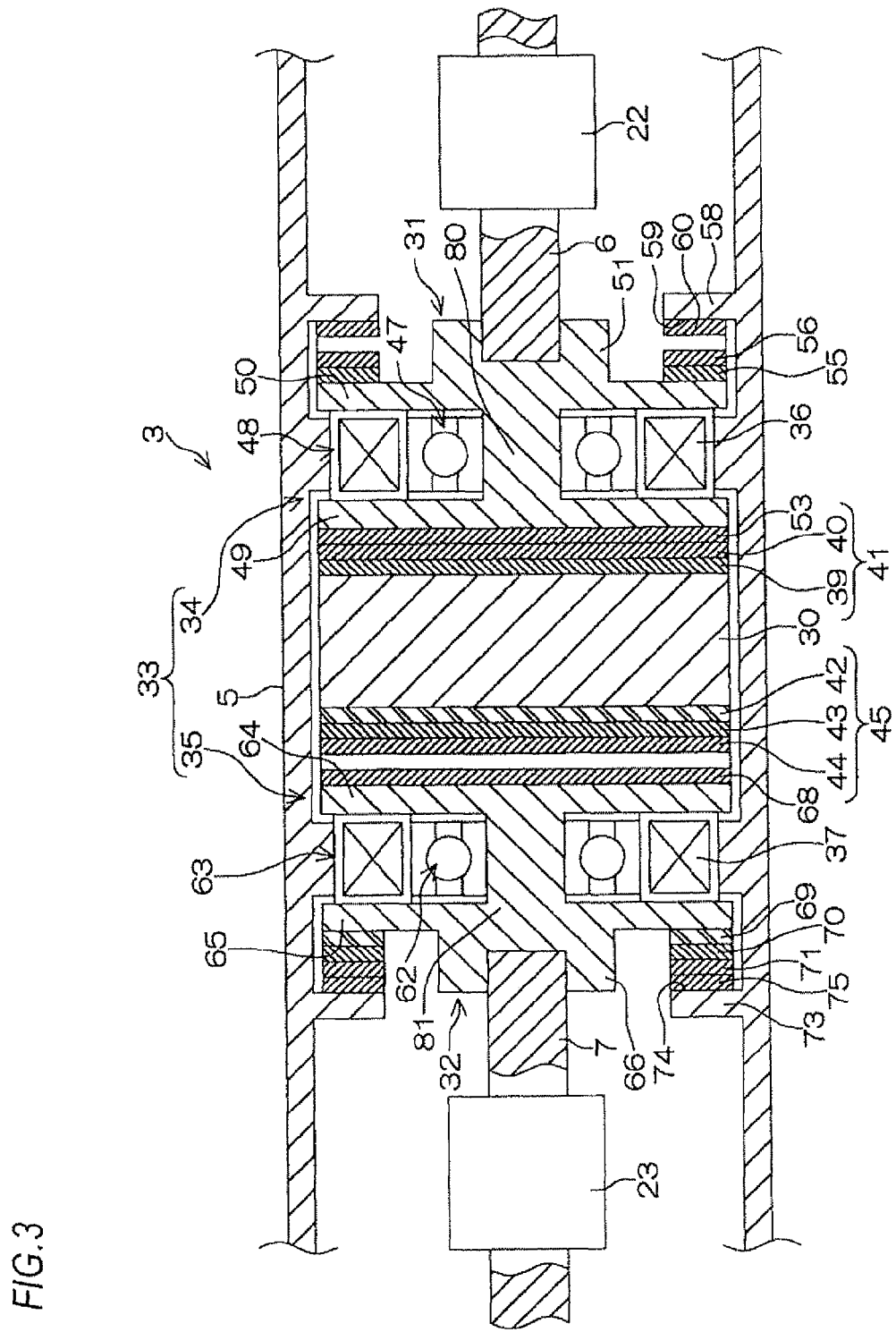
FIG. 3 is a cross-sectional view of an electrical actuator when an input shaft and a first rotor are connected to each other.
Figure 4:
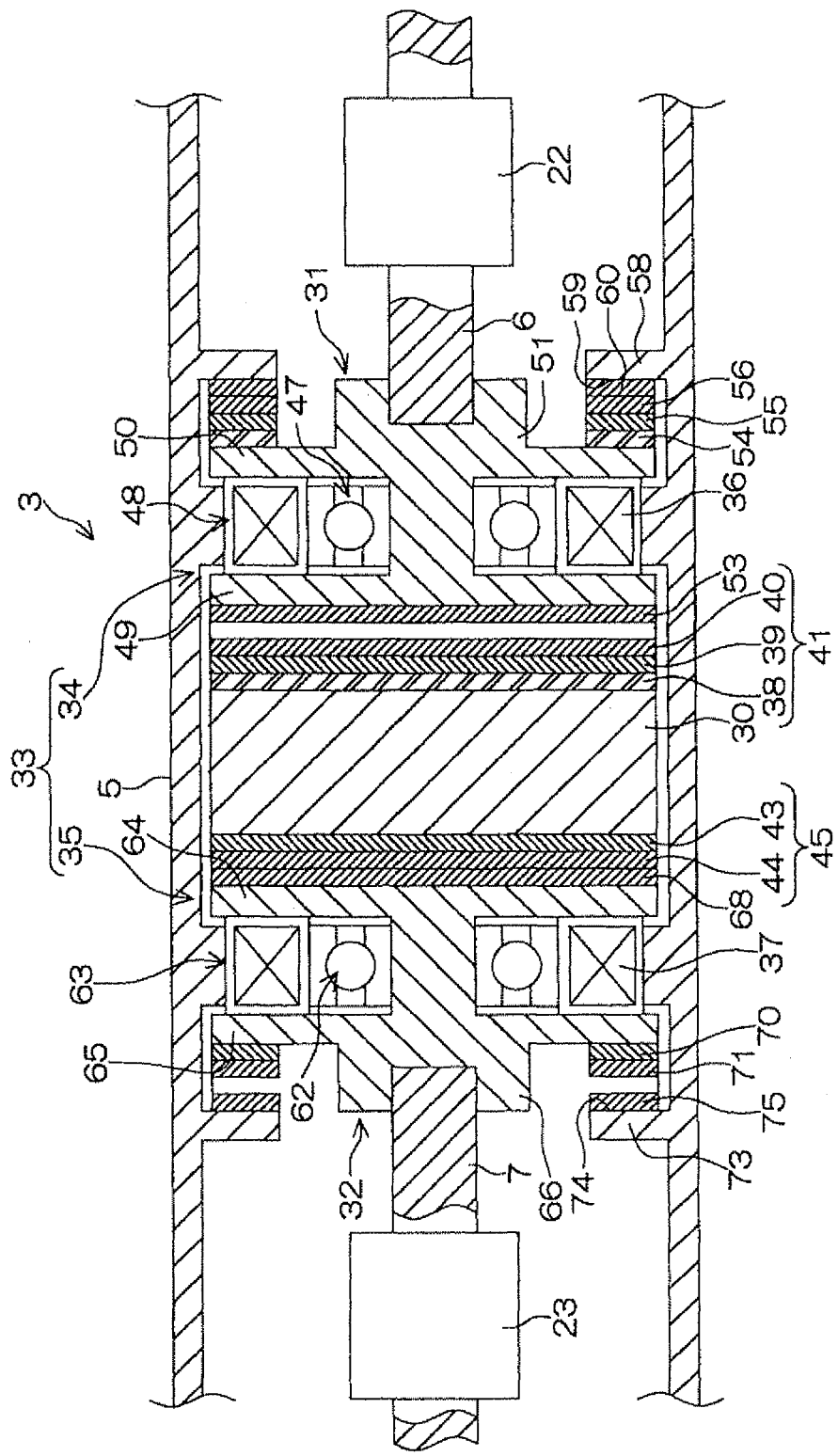
FIG. 4 is a cross-sectional view of an electrical actuator when an input shaft and a second rotor are connected to each other.

FIGS. 3 and 4 are cross-sectional views of the electrical actuator 3. FIG. 3 shows when an input shaft described below and a first rotor described below (first rotation member) 31 are connected to each other, and FIG. 4 shows the input shaft 30 and a second rotor (second rotation member) 32 are connected.

As described above, the input shaft 30 to which the rotating torque of the electric motor 9 (refer to FIG. 1) is input is accommodated in the casing 5. The outline of the input shaft 30 has a cylindrical shape, and the input shaft is disposed so as to be in the same center as the first output shaft 6 and the second output shaft 7. The input shaft 30 can be moved (reciprocate) in the axial direction. The first rotor 31 and the second rotor 32 are accommodated in the casing 5 so as to interpose the input shaft 30 in the axial direction. The first rotor 31 is disposed at one side of the input shaft 30 (right side shown in FIGS. 3 and 4). The second rotor 32 is disposed at the other side of the input shaft 30 (left side shown in FIGS. 3 and 4). Moreover, the first and second rotors 31 and 32 cannot be moved in the axial direction.

In addition, a clutch mechanism 33 for switching a destination of connection of the input shaft 30 between the first rotor 31 and the second rotor 32 (for selectively transmitting the rotating torque of the input shaft 30 to the first rotor 31 and the second rotor 32) is accommodated in the casing 5. The clutch mechanism 33 includes a first clutch 34 that connects the first rotor 31 to the input shaft 30 and releases the first rotor 31 from the input shaft 30, and a second clutch 35 that connects the second rotor 30 to the input shaft 30 and releases the second rotor 32 from the input shaft 30. The second clutch 35 is in a non-operating state (non-excitation state of a second electromagnetic coil 37 described below) at an operating state of the first clutch (excitation state of a first electromagnetic coil 36 described below), and the first clutch 34 is in a non-operating state (non-excitation state of the first electromagnetic coil 36 described below) at an operating state of the second clutch 35 (excitation state of the second electromagnetic coil 37 described below).

A first spring member (refer FIG. 4 and not shown in FIG. 3) 38 is disposed so as to be fixed to substantially the entire area of the side surface of the one side of the input shaft 30 (right side shown in FIGS. 3 and 4). For example, the first spring member 38 is configured of a disc-shaped plate spring or the like. A disc-shaped first magnetic plate 39 is disposed so as to be fixed to one side of the first spring member 38 (right side shown in FIGS. 3 and 4). Moreover, a disc-shaped first facing 40 is disposed so as to be fixed to one side (right side shown FIGS. 3 and 4) of the first magnetic plate 39. A first armature 41 described below is configured by the first magnetic plate 39 and the first facing 40. That is, the first spring member 38, the first magnetic plate 39, and the first facing 40 are disposed so as to be laminated in the order from the side of the input shaft 30. Each of the members 38, 39, and 40 has substantially the same outer diameter as one another, and the members are disposed so that a gap is formed between outer circumferences of the members and the inner circumference of the casing 5.

A second spring member (refer FIG. 3 and not shown in FIG. 4) 42 is disposed so as to be fixed to substantially the entire area of the side surface of the other side of the input shaft 30 (left side shown in FIGS. 3 and 4). For example, the second spring member 42 is configured of a disc-shaped plate spring or the like. A disc-shaped second magnetic plate 43 is disposed so as to be fixed to the other side of the second spring member 42 (left side shown in FIGS. 3 and 4). Moreover, a disc-shaped second facing 44 is disposed so as to be fixed to the other side (left side shown FIGS. 3 and 4) of the second magnetic plate 43. A second armature 45 described below is configured by the second magnetic plate 43 and the second facing 44. That is, the second spring member 42, the second magnetic plate 43, and the second facing 44 are disposed so as to be laminated in the order from the side of the input shaft 30. Each of the members 42, 43, and 44 has substantially the same outer diameter as one another, and the members are disposed so that a gap is formed between outer circumferences of the members and the inner circumference of the casing 5.

Thereby, each of the members 38, 39, 40, 42, 43, and 44 is integrally rotated with the input shaft 30 and is moved in the axial direction along with the input shaft 30.

Next, the first rotor 31 and the first clutch 34 will be described.

The first rotor 31 is coaxially and rotatably supported to the input shaft 30 via a first rolling bearing 47 and an annular first field 48 (described below). Specifically, the first field 48 is fitted and fixed into the easing 5, and an outer ring of the first rolling bearing 47 is fitted and fixed into the inner circumference of the first field 48. The first rotor 31 includes a main body portion 80 having an outline of an approximately cylindrical shape, a first armature hub 49 having a large diameter that protrudes outside in the radial direction from the outer circumference of the main body portion 80, a first brake hub 50 having a large diameter that protrudes outside in the radial direction from the outer circumference of the main body portion 80, and a first boss 51 for supporting an end of a first output shaft 6. The first armature hub 49 is provided in the inner end (end of the side of the input shaft 30 and left end shown in FIGS. 3 and 4) in the axial direction. The first brake hub 50 is provided further outside (side opposite to the input shaft 30 and right side shown in FIGS. 3 and 4) in the axial direction than a supporting position of the first rolling bearing 47. The first armature hub 49 and the first brake hub 50 have substantially the same diameter as each other. The first boss 51 is formed outside (side opposite to the side of the input shaft 30 and right side shown in FIGS. 3 and 4) in the axial direction of the first brake hub 50. The end of the first output shaft 6 (left end shown in FIGS. 3 and 4) is mounted so as to be fixed to the first boss 51.

The first clutch 34 includes the first field 48 and the first armature 41. The first field 48 houses the first electromagnetic coil 36 in the yoke. A third facing 53 having a discoid shape is disposed so as to be fixed to the entire area of the side surface of the side of the input shaft 30 (left surface shown in FIGS. 3 and 4) of the first rotor (first armature hub 49). The third facing is a facing for being frictionally engaged with the first facing 40. The third facing 53 is disposed so that a gap is formed between the outer circumference of the third facing and the inner circumference of the casing 5.

Moreover, an annular third spring member 54 (refer to FIG. 4 and not shown in FIG. 3) is disposed so as to be fixed to the circumferential edge portion of the side surface (right surface shown in FIGS. 3 and 4) opposite to the side of the input shaft 30 in the first brake hub 50. For example, the third spring member 54 is configured of a plate spring or the like. An annular plate-like first magnetic ring 55 is disposed so as to be fixed to the side (right side shown in FIGS. 3 and 4) opposite to the side of the input shaft 30 in the third spring member 54. The first magnetic ring 55 is disposed at a position at which the circumferential edge portion of the first armature hub 49 is interposed between the first magnetic ring and the first field 48. In addition, an annular plate-like fourth facing (a first engagement portion and a frictional portion) 56 is disposed so as to be fixed to the side (right side shown in FIGS. 3 and 4) opposite to the side of the input shaft 30 in the first magnetic ring 55. That is, the third spring member 54, the first magnetic ring 55, and the fourth facing 56 are disposed so as to be laminated in the order from the side of the input shaft 30. Each of the members 54, 55, and 56 has substantially the same inner diameter and outer diameter as one another, and the members are disposed so that a gap is formed between outer circumferences of the members and the inner circumference of the casing 5. Each of the members 54, 55 and 56 is integrally rotated with the first rotor 31 and is moved in the axial direction along with the first rotor 31.

On the other hand, an annular plate-like first engagement ring 58 which encloses the first boss 51 and the first output shaft 6 is formed so as to protrude inward from the inner circumference in the casing 5. The first engagement ring 58 is disposed at the side (right side shown in FIGS. 3 and 4) further separated from the side of the input shaft 30 than the first brake hub 50 in the axial direction. The first engagement ring 58 includes a first opposite surface 59 that is opposite to the circumferential edge portion (that is, the disposition area of the fourth facing 56) of the side surface (right surface shown in FIGS. 3 and 4) opposite to the side of the input shaft 30 in the first brake hub 50. A fifth facing (casing side engagement portion) 60 for being frictionally engaged with the fourth facing 56 is disposed so as to be fixed to the first opposite surface 59. The fifth facing 60 is disposed so that a gap is formed between the outer circumference of the fifth facing and the inner circumference of the casing 5.

The fourth facing 56 is frictionally engaged with the fifth facing 60 in the non-excitation state (refer to FIG. 4) of the first electromagnetic coil 36. In addition, in the excitation state (refer to FIG. 3) of the first electromagnetic coil 36, the first magnetic ring 55 that is integrally provided in the fourth facing 56 is attracted to the first field 48 including the first electromagnetic coil 36, and the fourth facing 56 is moved toward a direction separated from the fifth facing 60 (left direction shown in FIGS. 3 and 4), and therefore, the engagement between the fourth facing 56 and the fifth facing 60 are released, and a gap is formed between the fourth facing 56 and the fifth facing 60.

Next, the second rotor 32 and the second clutch 35 will be described.

The second rotor 32 is coaxially and rotatably supported to the input shaft 30 via a second rolling bearing 62 and an annular second field 63 (described below). Specifically, the second field 63 is fitted and fixed into the casing 5, and an outer ring of the second rolling bearing 62 is fitted and fixed into the inner circumference of the second field 63. The second rotor 32 includes a main body portion 81 having an outline of an approximately cylindrical shape, a second armature hub 64 having a large diameter that protrudes outside in the radial direction from the outer circumference of the main body portion 81, a second brake hub 65 having a large diameter that protrudes outside in the radial direction from the outer circumference of the main body portion 81, and a second boss 66 for supporting an end of the second output shaft 7. The second armature hub 64 is provided in the inner end in the axial direction (end of the side of the input shaft 30 and right end shown in FIGS. 3 and 4). The second armature hub 64 is provided further outside (side opposite to the input shaft 30 and left side shown in FIGS. 3 and 4) in the axial direction than a supporting position of the second rolling bearing 62. The second armature hub 64 and the second brake hub 65 have substantially the same diameter as each other. The second boss 66 is formed outside in the axial direction of the second brake hub 65 (side opposite to the side of the input shaft 30 and left side shown in FIGS. 3 and 4). The end of the second output shaft 7 (right end shown in FIGS. 3 and 4) is mounted so as to be fixed to the second boss 66.

The second clutch 35 includes the second field 63 and the second armature 45. The second field 63 houses the second electromagnetic coil 37 in the yoke. A sixth facing 68 having a discoid shape is disposed so as to be fixed to the entire area of the side surface (right surface shown in FIGS. 3 and 4) of the side of the input shaft 30 of the second rotor 32 (second armature hub 64). The sixth facing 68 is a facing for being frictionally engaged with the second facing 44. The sixth facing 68 is disposed so that a gap is formed between the outer circumference of the sixth facing and the inner circumference of the casing 5.

Moreover, an annular fourth spring member 69 (refer to FIG. 3 and not shown in FIG. 4) is disposed so as to be fixed to the circumferential edge portion of the side surface (left surface shown in FIGS. 3 and 4) opposite to the side of the input shaft 30 in the second brake hub 65. For example, the fourth spring member 69 is configured of a plate spring or the like. An annular plate-like second magnetic ring 70 is disposed so as to be fixed to the side (left side shown in FIGS. 3 and 4) opposite to the side of the input shaft 30 in the fourth spring member 69. The second magnetic ring 70 is disposed at a position at which the circumferential edge portion of the second armature hub 64 is interposed between the second magnetic ring and the second field 63. In addition, an annular plate-like seventh facing 71 is disposed so as to be fixed to the side (left side shown in FIGS. 3 and 4) opposite to the side of the input shaft 30 in the second magnetic ring 70. That is, the fourth spring member 69, the second magnetic ring 70, and the seventh facing 71 are disposed so as to be laminated in the order from the side of the input shaft 30. Each of the members 69, 70, and 71 has substantially the same inner diameter and outer diameter as one another, and the members are disposed so that a gap is formed between outer circumferences of the members and the inner circumference of the casing 5. Each of the members 69, 70 and 71 is integrally rotated with the second rotor 32 and is moved in the axial direction along with the second rotor 32.

On the other hand, an annular plate-like second engagement ring 73 which encloses the second boss 66 and the second output shaft 7 is formed so as to protrude inward from the inner circumference in the casing 5. The second engagement ring 73 is disposed at the side (left side shown in FIGS. 3 and 4) further separated from the side of the input shaft 30 than the second brake hub 65 in the axial direction. The second engagement ring 73 includes a second opposite surface 74 that is opposite to the circumferential edge portion (that is, the disposition area of the seventh facing 71) of the side surface (left surface shown in FIGS. 3 and 4) opposite to the side of the input shaft 30 in the second brake hub 65. An eighth facing (casing side engagement portion) 75 for being frictionally engaged with the seventh facing 71 is disposed so as to be fixed to the second opposite surface 74. The eighth facing 75 is disposed so that a gap is formed between the outer circumference of the eighth facing and the inner circumference of the casing 5.

The seventh facing 71 is frictionally engaged with the eighth facing 75 in the non-excitation state (refer to FIG. 3) of the second electromagnetic coil 37. In addition, in the excitation state (refer to FIG. 4) of the second electromagnetic coil 37, the second magnetic ring 70 that is integrally provided in the seventh facing 71 is attracted to the second field 63 including the second electromagnetic coil 37, and the seventh facing 71 is moved toward a direction (right direction shown in FIGS. 3 and 4) separated from the eighth facing 75, and therefore, the engagement between the seventh facing 71 and the eighth facing 75 are released, and a gap is formed between the seventh facing 71 and the eighth facing 75.

In addition, for example, first to eighth facings 40, 44, 53, 56, 60, 68, 71, and 75 are formed using a friction material such as a cold rolled special steel strip (SK5M or the like).

When the input shaft 30 and the first rotor 31 are connected to each other (refer to FIG. 3), the first clutch 34 is in a connection state, and the second clutch is in a release state. At this time, the first electromagnetic coil 36 is in an excitation state and the second electromagnetic coil 37 is in a non-excitation state.

In this state, the second armature 45 is not attracted to the second field 63 while the first armature is attracted to the first field 48. Therefore, the first armature 41 and the input shaft 30 are moved toward the side of the first rotor 31 (right direction shown in FIGS. 3 and 4). Moreover, the third facing 53, which configures a portion of the first armature 41, is frictionally engaged with the first facing 40 that is fixed to the first rotor 31. Thereby, the engagement between the first armature 41 and the input shaft 30 is achieved, and the first output shaft 6 is connected to the input shaft 30.

In addition, in the excitation state of the first electromagnetic coil 36, the first magnetic ring 55 is attracted to the side of the first electromagnetic coil 36 and is moved in the axial direction toward the side of the first electromagnetic coil 36 (left side shown in FIGS. 3 and 4). Therefore, the fourth facing 56 that is fixed to the first magnetic ring 55 is moved toward a direction separated from the fifth facing 60 (first engagement ring 58), and thereby, the engagement between the fourth facing 56 and the fifth facing 60 is released. Therefore, the rotating torque of the input shaft 30 is transmitted to the first rotor 31. Moreover, the rotating torque of the first rotor 31 is transmitted to the first output shaft 6 that is fixed to the first rotor 31. According to the rotation of the first output shaft 6, the first nut 22 is moved in the axial direction, and thereby, the select shaft 12 is rotated.

In addition, in the connection state of the input shaft 30 and the first output shaft 6, the first spring member 38 is interposed between the first magnetic plate and the input shaft 30 and is shrunk in the axial direction, and the third spring member 54 is interposed between the first magnetic ring 55 and the first brake hub and is shrunk in the axial direction. Thereby, the first spring member 38 and the third spring member 54 are not shown in FIG. 3.

Moreover, in the non-excitation state of the second electromagnetic coil 37, the second magnetic ring 70 is not attracted to the side of the second electromagnetic coil 37, and the second magnetic ring 70 is not moved in the axial direction. Thereby, the seventh facing 71, which is fixed to the second magnetic ring 70, and the eighth facing 75 (second engagement ring 73) are in a state in which the seventh facing 71 and the eighth facing 75 are engaged with each other. That is, when the input shaft 30 and the first rotor 31 are connected to each other, the second rotor 32 is connected to the casing 5. In the connection state of the second rotor 32 and the casing 5, the second rotor 32 is held by the casing 5 and cannot be rotated.

On the other hand, as shown in FIG. 4, when the input shaft 30 and the second rotor 32 are connected to each other (refer to FIG. 4), the second clutch 35 is in a connection state, and the first clutch 34 is in a release state. At this time, the second electromagnetic coil 37 is in an excitation state and the first electromagnetic coil 36 is in a non-excitation state.

In this state, the first armature 41 is not attracted to the first field 48 while the second armature 45 is attracted to the second field 63. Therefore, the second armature 45 and the input shaft 30 are moved toward the side of the second field 63. Moreover, the sixth facing 68, which configures a portion of the second armature 45, is frictionally engaged with the second facing 44 that is fixed to the input shaft 30. Thereby, the engagement between the second armature 45 and the input shaft 30 is achieved, and the second output shaft 7 is connected to the input shaft 30.

In addition, in the excitation state of the second electromagnetic coil 37, the second magnetic ring 70 is attracted to the side of the second electromagnetic coil 37 and is moved in the axial direction toward the side of the second electromagnetic coil 37. Therefore, the seventh facing 71 that is fixed to the second magnetic ring 70 is moved toward a direction separated from the eighth facing 75 (second engagement ring 73), and thereby, the engagement between the seventh facing 71 and the eighth facing 75 is released. Therefore, the rotating torque of the input shaft 30 is transmitted to the second rotor 32. Moreover, the rotating torque of the second rotor 32 is transmitted to the second output shaft 7 that is fixed to the second rotor 32. According to the rotation of the second output shaft 7, the second nut 23 is moved in the axial direction, and thereby, the select shaft 12 is rotated.

In addition, since the input shaft 30 is moved to the side of the second field 63, the first armature 41 and the third facing 53 that is fixed to the first rotor 31 are not engaged with each other. Moreover, in a non-excitation state of the first electromagnetic coil 36, the first magnetic ring 55 is not attracted to the side of the first electromagnetic coil 36, and the first magnetic ring is not moved in the axial direction. Thereby, the fourth facing 56, which is fixed to the first magnetic ring 55, and the fifth facing 60 (first engagement ring 58) are in a state in which the fourth facing 56 and the fifth facing 60 are engaged with each other. That is, when the input shaft 30 and the second rotor 32 are connected to each other, the first rotor 31 is connected to the casing 5. In the connection state of the first rotor 31 and the casing 5, the first rotor 31 is held by the casing 5 and cannot be rotated.

In addition, in the connection state of the input shaft 30 and the second output shaft 7, the second spring member 42 is interposed between the second magnetic plate and the input shaft 30 and is shrunk in the axial direction, and the fourth spring member 69 is interposed between the second magnetic ring 70 and the second brake hub 65 and is shrunk in the axial direction. Thereby, the second spring member 42 and the fourth spring member 69 are not shown in FIG. 4.

As described above, according to this embodiment, in the connection state of the first rotor 31 and the input shaft 30, the second rotor 32 is connected to the casing 5. In the connection state of the second rotor 32 and the casing 5, the second rotor 32 cannot be rotated. Therefore, when there is reverse input in the second rotor 32, the rotation of the shift shaft 8 can be prevented.

Moreover, in the connection state of the second rotor 32 and the input shaft 30, the first rotor 31 is connected to the casing 5. In the connection state of the first rotor 31 and the casing 5, the first rotor 31 cannot be rotated. Therefore, when there is reverse input in the first rotor 31, the rotation of the select shaft 12 can be prevented.

Moreover, the connection and the release of the rotors 31 and 32 with respect to the casing 5 are performed using the electromagnetic coils 36 and 37 of the clutches 34 and 35. Therefore, it is not necessary to provide a dedicated magnetic circuit for performing the connection and the release of the rotors 31 and 32 with respect to the casing 5, and thereby, reduction in the costs can be improved.

Moreover, since the seventh and eighth facings 71 and 75 are formed in an annular shape respectively, the seventh facing 71 and the eighth facing 75 are engaged with each other regardless of the rotation posture of the first rotor 31 with respect to the input shaft 30. In addition, since the seventh and eighth facings 71 and 75 are formed in an annular shape respectively, the seventh facing 71 and the eighth facing 75 can be engaged with each other regardless of the rotation posture of the second rotor 32 with respect to the input shaft 30. Thereby, the mutual rotation posture in the connection state of the input shaft 30 and the rotors 31 and 32 is not limited.

Figure 5:
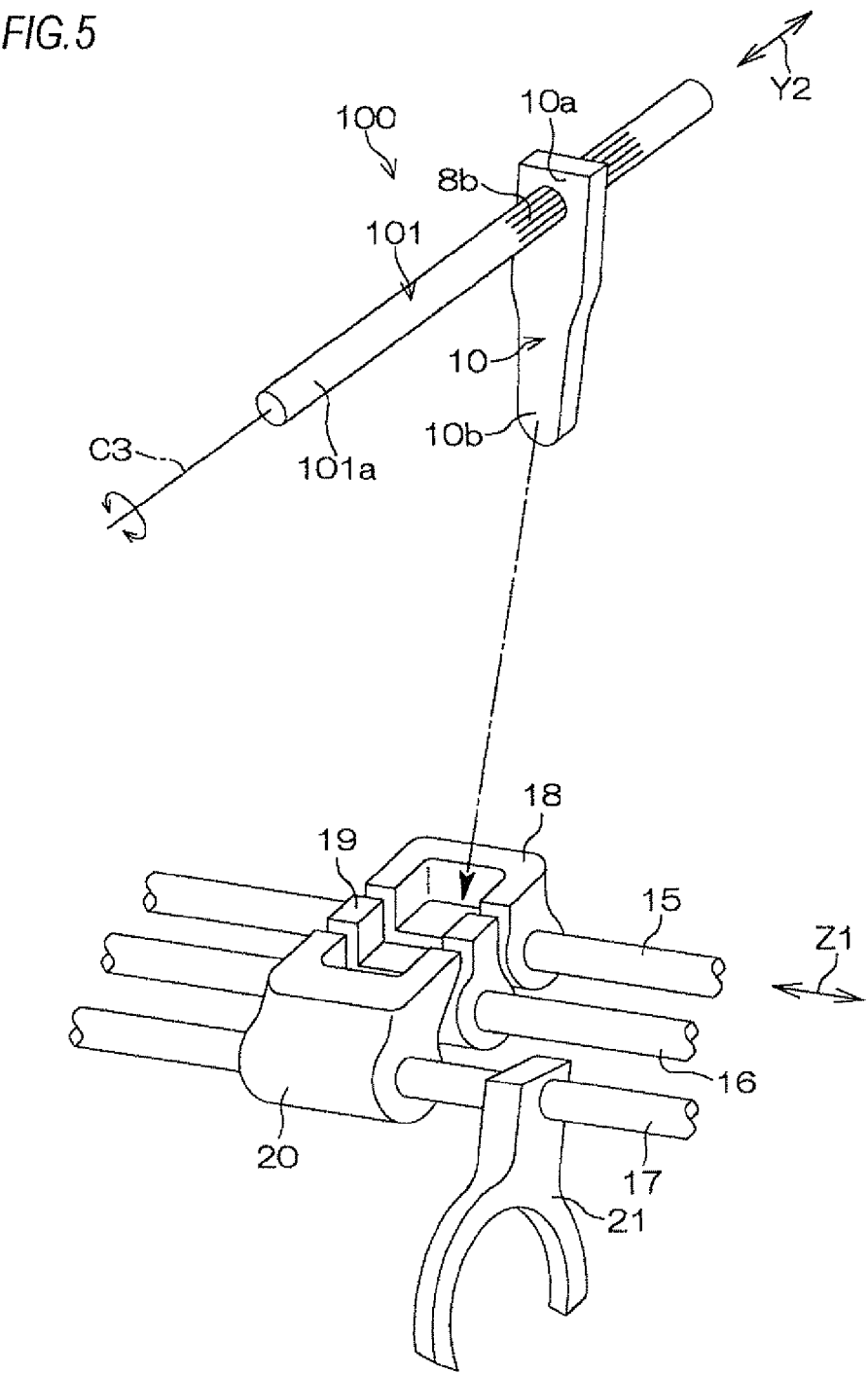
FIG. 5 is an exploded perspective view showing a schematic configuration of a transmission driving device according to another embodiment (second embodiment) of the present invention.

FIG. 5 is an exploded perspective view showing a schematic configuration of a transmission driving device 100 according to another embodiment (second embodiment) of the present invention. In the second embodiment, the same reference numerals as the first embodiment are denoted to portions corresponding to each portion of the embodiment (first embodiment) shown in FIGS. 1 to 4, descriptions thereof are omitted. Differences between a transmission driving device 100 shown in FIG. 5 and the transmission driving device 1 shown in FIG. 1 are that a shift select shaft (shift operation member and select operation member) 101 for performing a shift operation and a select operation instead of the shift shaft 8 and the select shaft 12 is provided in a shifting mechanism. The transmission driving device 100 includes an electrical actuator 102 (refer to FIG. 6) which is used as a common drive source for performing the shift operation and the select operation of the shift select shaft 101.

One end 10a of the internal lever 10 that is accommodated in the gear housing 4 is fixed to a middle portion of the shift select shaft 101. One end 10a of the shift select shaft 101 protrudes outside the gear housing 4 and penetrates into the electrical actuator 102 (refer to FIG. 6) that is provided outside the gear housing 4. The shift select shaft 101 is moved in an axial direction Y2 by the electrical actuator 102 and is rotated around a center axis line C3 thereof. The electrical actuator 102 is fixed to the outer surface of the gear housing 4 or a predetermined place of a vehicle.

If the shift select shaft 101 is moved in an axial direction Y2 by the electrical actuator 102, the other end 10b of the inter lever 10 is engaged with desired shift blocks 18, 19, and 20, and thereby, the select operation is achieved. In addition, if the shift select shaft 101 is rotated around the center axis line C3 by the electrical actuator 102, the shift blocks 18, 19, and 20 which are respectively engaged with the internal lever 10 are moved the axial direction Z1 of the shift rods 15, 16, and 17, and thereby, the shift operation is achieved.

Figure 6:
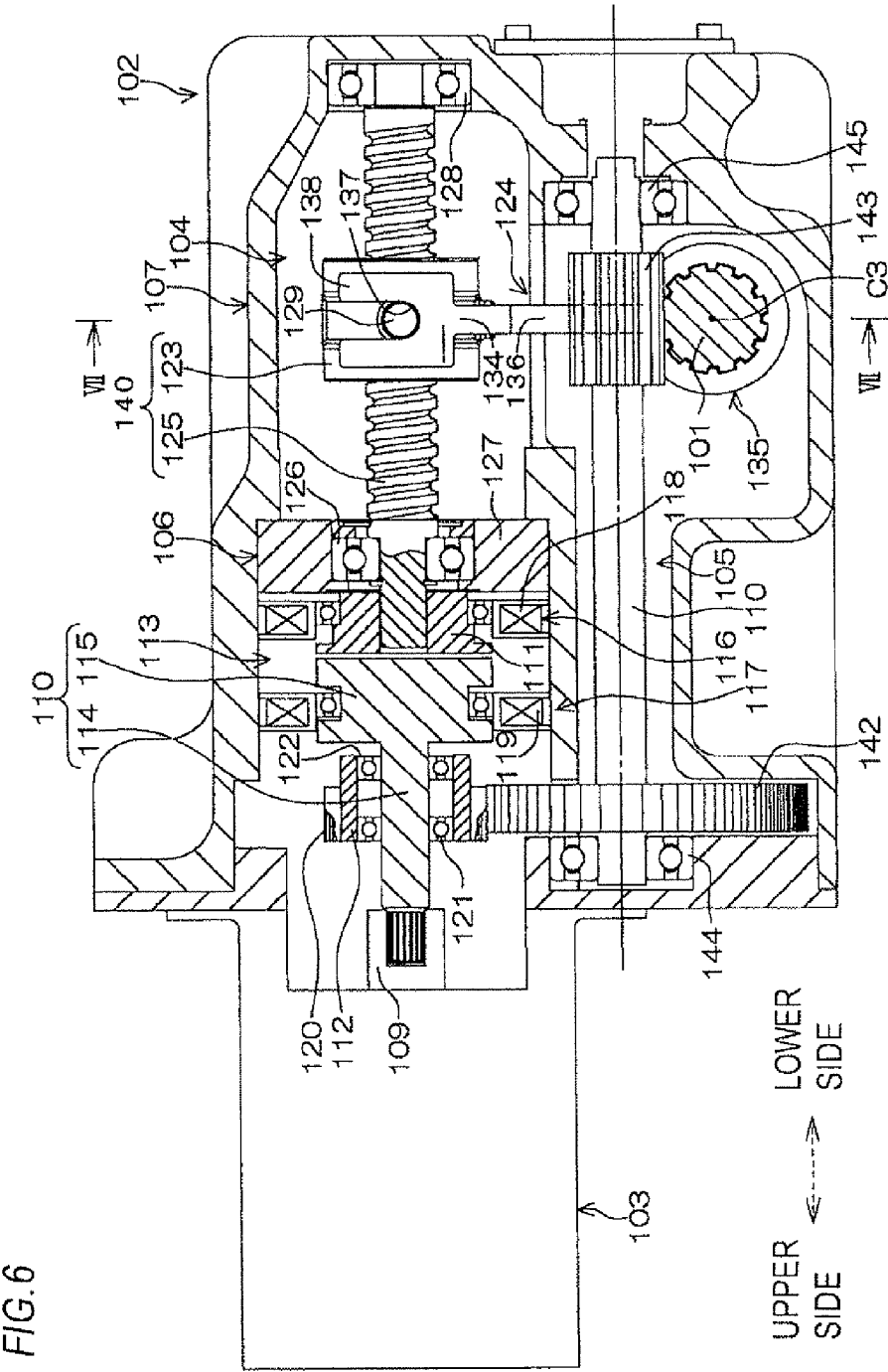
FIG. 6 is a cross-sectional view of the electrical actuator of a transmission driving device shown in FIG. 5.
Figure 7:
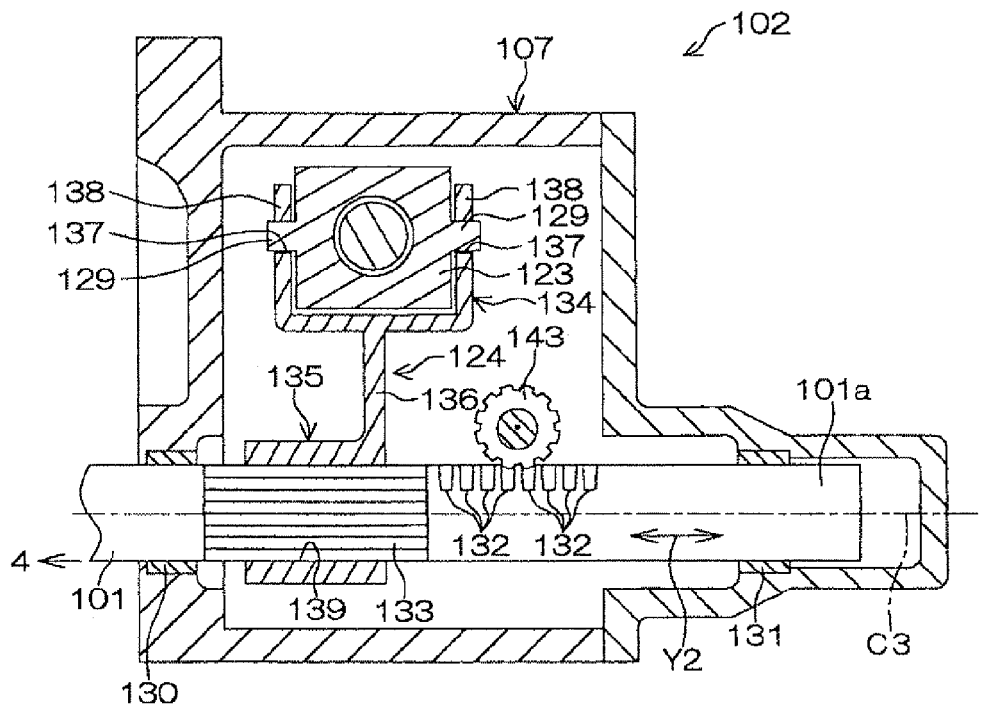
FIG. 7 is a cross-sectional view taken along a section line VII-VII of FIG. 6.

FIG. 6 is a cross-sectional view of the electrical actuator of a transmission driving device shown in FIG. 5. FIG. 7 is a cross-sectional view taken along a section line VII-VII of FIG. 6.

The electrical actuator 102 includes an electric motor 103, a shift conversion mechanism 104 for converting the rotating torque of the electric motor 103 to a force that rotates the shift select shaft 101 around the center axis line C3, a select conversion mechanism 105 for converting the rotating torque of the electric motor 103 to a force that is moved the shift select shaft 101 in the axial direction Y2, and a switching unit 106 for switching a destination of transmission of the rotation driving force of the electric motor 103 between the shift conversion mechanism 104 and the select conversion mechanism 105. The electric motor 103, the shift conversion mechanism 104, the select conversion mechanism 105, and the switching unit 106 are accommodated in a casing 107 having an approximately cylindrical shape.

For example, a brushless motor is adopted as the electric motor 103. The electric motor 103 is disposed outside the casing 107. An output shaft 109 of the electric motor 103 extends along a predetermined direction (left and right directions shown in FIG. 6) perpendicular to the shift select shaft 101.

The switching unit 106 includes a first transmission shaft (input shaft) 110 that is coaxially connected to the output shaft 109 of the electric motor 103, a first rotor (first rotation member) 112 that is coaxially and rotatably provided in the first transmission shaft 110, a second rotor 111 that is coaxially and rotatably provided in the first transmission shaft 110, and a clutch mechanism 113 for switching (selectively transmitting the rotating torque of the first transmission shaft 110 to the first rotor 112 and the second rotor 111) a destination of connection of the first transmission shaft 110 between the first rotor 112 and the second rotor (second rotation member) 111. The second rotor 111 is disposed at the side opposite to the electric motor 103 with respect to the first transmission shaft 110.

The first transmission shaft 110 includes a main shaft portion 114 having a small diameter that is provided in the side of the electric motor 103 and a large diameter portion 115 that is provided in the side of the second rotor 111 so as to be continuous to the main shaft portion 114 and has a larger diameter than that of the main shaft portion 114. The first rotor 112 that encloses the outer circumference of the main shaft portion 114 of the first transmission shaft 110 is provided at the side opposite to the second rotor 111 with respect to the large diameter portion 115 of the first transmission shaft. That is, the first and second rotors 112 and 111 are disposed so as to interpose the large diameter portion 115 of the first transmission shaft 110.

The clutch mechanism 113 includes a first clutch 117 that connects the first rotor 112 to the first transmission shaft 110, and releases the first rotor 112 from the first transmission shaft 110, and a second clutch 116 that connects the second rotor 111 to the first transmission shaft 110, and releases the second rotor 111 from the first transmission shaft 110. The second clutch 116 is in a non-operating state (non-excitation state of a second electromagnetic coil 118) at an operating state of the first clutch 117 (excitation state of a first electromagnetic coil 119). The first clutch 117 is in a non-operating state (non-excitation state of the first electromagnetic coil 119 described below) at an operating state of the second clutch 116 (excitation state of the second electromagnetic coil 118 described below).

An annular first gear 120 having a relatively small diameter is externally fitted and fixed to the outer circumference of the first rotor 112. The first gear 120 is coaxially provided on the first rotor 112. The first gear 120 is supported by rolling bearings 121 and 122. The outer rings of the rolling bearings 121 and 122 are fitted and fixed into the first gear 120. The inner rings of the rolling bearings 121 and 122 are externally fitted and fixed to the outer circumference of the main shaft portion 114 of the first transmission shaft 110.

The shift conversion mechanism 104 includes a ball screw mechanism 140 and a connection rod 124 that connects a nut 123 of the ball screw mechanism 140 and a shift select shaft 101. The ball screw mechanism 140 includes a screw shaft 125 that is connected to the second rotor 111 and coaxially extends with the second rotor 111, and a nut 123 that is mounted on the screw shaft 125. A plurality of balls (not shown) are interposed so as to roll between a male screw of the screw shaft 125 and a female screw of the nut 123, and the ball screw mechanism 140 converts a rotation motion of the second rotor 111 into an axial linear motion of the nut 123.

One end of the screw shaft 125 (left end shown in FIG. 6) is supported by a rolling bearing 126. The inner ring of the rolling bearing 126 is externally fitted and fixed to one end of the screw shaft 125. Moreover, the outer ring of the rolling bearing 126 is fitted and fixed to a through-hole that penetrates inner and outer surfaces of a bottom wall 127 of a unit casing fixed to the casing. In addition, a lock nut is engaged to the outer ring of the rolling bearing 126, and the movement of the rolling bearing toward the other side in the axial direction (right side shown in FIG. 6) is regulated. A portion that is positioned further toward the side of the electric motor 103 (left side shown in FIG. 6) than the rolling bearing 126 in one end of the screw shaft 125 is inserted into the inner circumference of the second rotor 111 and is integrally and rotatably connected to the second rotor 111.

The other end of the screw shaft 125 (right end shown in FIG. 6) is supported by a rolling bearing 128. The outer ring of the rolling bearing 128 is fixed to the casing 107. In both side surfaces of the nut 123, a pair of columnar engagement shafts 129 (only one is shown in FIG. 6) that extends in a direction (a direction perpendicular to the paper surface in FIG. 6 and left and right directions shown in FIG. 7) parallel to the shift select shaft 101 is formed so as to protrude.

The shift select shaft 101 is supported so as to be linearly reciprocated in an axial direction Y2 and to be rotated by a pair slide bearings 130 and 131 (refer to FIG. 7) that is fitted and fixed into the casing 107. A plurality of rack teeth 132 (refer to FIG. 7) are formed on the outer circumference of the shift select shaft 101 with intervals in the axial direction Y2. A spline portion 133 is formed at a predetermined position close to a gear box 2 from the rack teeth 132 in the outer circumference of the shift select shaft 101.

The connection rod 124 includes a first portion 134 that is connected to the nut 123, a second portion 135 (refer to FIG. 7) that is connected to the shift select shaft 101, and a connection portion 136 that connects the first portion 134 and the second portion 135. The first portion 134 includes a pair of supporting plate portions 138 that has a U-shaped engagement groove 137 that is engaged with each engagement shaft 129. The second portion 135 has a cylindrical shape and is externally fitted to the shift select shaft 101. Spline grooves 139 (refer to FIG. 7) that are spline-fitted to the spline portion 133 formed on the outer circumference of the shift select shaft 101 are formed on the inner circumference of the second portion 135. Thereby, the second portion 135 is connected to the shift select shaft 101 in a state where the second portion cannot be relatively rotated and can be relatively moved in the axial direction with respect to the shift select shaft 101. Therefore, according to the rotation of the screw shaft 125, if the nut 123 is moved along the axial direction of the screw shaft (left and right directions shown in FIG. 6 and the direction perpendicular to the paper surface in FIG. 7), the connection rod 124 swings around the center axis line C3 of the shift select shaft 101.

The select conversion mechanism 105 includes a first gear 120, a second transmission shaft 141 that extends to be parallel to the first transmission shaft 110 and is rotatably provided, a second gear 142 that is coaxially fixed at a predetermined position close to one end in the second transmission shaft 141 (left end shown in FIG. 6), and a pinion 143 having a small diameter that is coaxially fixed at a predetermined position close to the other end of the second transmission shaft 141 (right end shown in FIG. 6). Moreover, the second gear 142 is formed so as to have a larger diameter than those of the first gear 120 and the pinion 143.

One end of the second transmission shaft 141 (left end shown in FIG. 6) is supported by a rolling bearing 144. The inner ring of the rolling bearing 144 is externally fitted and fixed to one end of the second transmission shaft 141 (left end shown in FIG. 6). In addition, the outer ring of the rolling bearing 144 is fixed into a cylindrical recess that is formed on the inner surface of a cover which covers an opening of the casing 107. Moreover, the other end of the second transmission shaft 141 (right end shown in FIG. 6) is supported by a rolling bearing 145.

Figure 8:
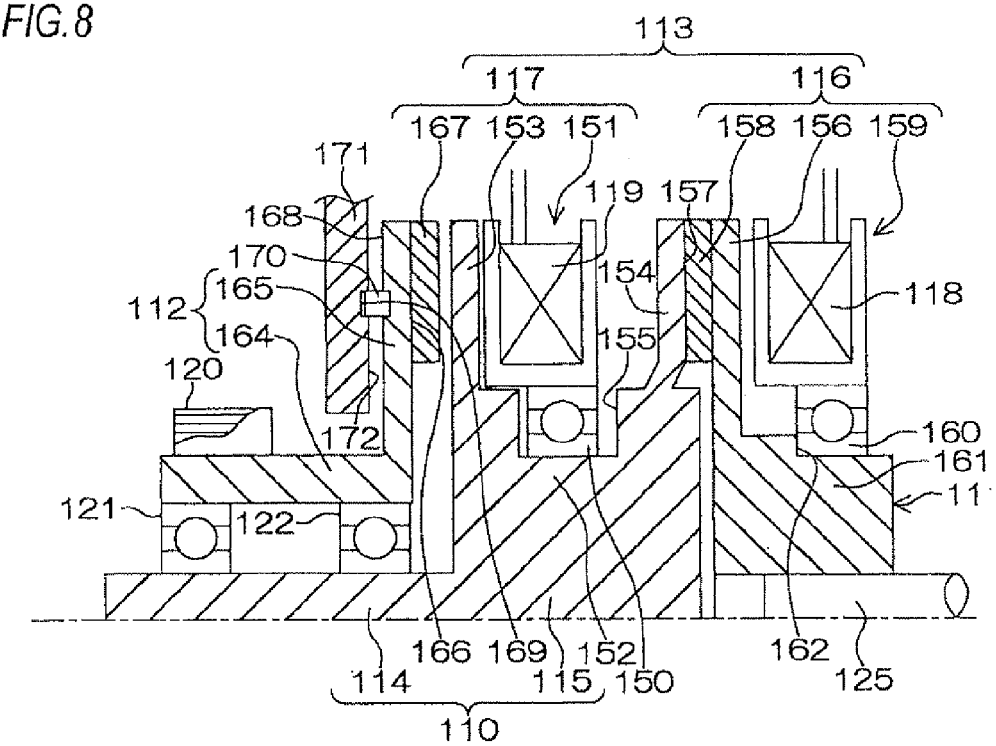
FIG. 8 is an enlarged cross-sectional view showing configurations of a first transmission shaft, the first rotor, the second rotor, and a clutch mechanism when a first transmission shaft and the second rotor are connected to each other.

FIGS. 8 and 9 are expanded cross-sectional views showing configurations of the first transmission shaft 110, the first and second rotors 112 and 111, and the clutch mechanism 113. FIG. 8 shows when the first transmission shaft 110 and the second rotor 111 are connected to each other, and FIG. 9 shows when the first transmission shaft 110 and the first rotor 112 are connected to each other.

The first transmission 110 is coaxially and rotatably supported to the output shaft 109 of the electric motor 103 via a rolling bearing 150 and an annular first field 151 (described below). Specifically, the first field 151 is fitted and fixed into the casing 107 (the casing 107 is not shown in FIGS. 8 and 9), and the outer ring of the rolling bearing 150 is fitted and fixed into the first field 151.

The large diameter portion 115 includes a main body 152 of the large diameter portion, a first armature hub 153 that extends outward in the radial direction from the outer circumference of the main body 152 of the large diameter portion, and an armature support hub 154 that extends outward in the radial direction from the outer circumference of the main body 152 of the large diameter portion. The first armature hub 153 is provided in the end of the side of the electric motor 103 of the large diameter portion 115 (left side shown in FIGS. 8 and 9). The armature support hub 154 is provided in the end of the side of the second rotor 111 of the large diameter portion 115 (right side shown in FIGS. 8 and 9).

An accommodation groove 155 that accommodates the rolling bearing 150 is formed between the first armature hub 153 and the armature support hub 154 in the outer circumference of the main body 152 of the large diameter portion. Moreover, the first field 151 that is externally fitted and fixed to the rolling bearing 150 is disposed so as to be adjacent to one side (right side shown in FIGS. 8 and 9) in the axial direction of the first armature hub 153.

In addition, for example, the armature support hub 154 is formed of an annular plate spring. The armature support hub 154 includes a first opposite surface 157 that is opposed to a second armature hub 156. A second armature 158 for being engaged with the second armature hub 156 is disposed so as to be fixed to the first opposite surface 157.

As described above, the first rotor 112 is coaxially and rotatably supported to output shaft 109 of the electric motor 103 by the main shaft portion 114 of the first transmission shaft 110 via the rolling bearings 121 and 122. The first rotor 112 includes a cylindrical main body portion 164 of the first rotor, and a plate spring portion 165 that is provided at the end (right end shown in FIGS. 8 and 9) of the side of the large diameter portion 115 in the first rotor 112. The plate spring portion 165 includes a second opposite surface 166 that is opposed to the first armature hub 153 and has an annular plate shape, and the inner circumferential end of the plate spring portion is connected to the end of the side of the large diameter portion 115 of the main body portion 164 of the first rotor (right end shown in FIGS. 8 and 9). A first armature 167 for being engaged with the first armature hub 153 is disposed so as to be fixed to the second opposite surface 166. That is, the first armature 167 and the first field 151 are disposed at a position in which the first armature hub 153 is interposed. The first field 151 houses the first electromagnetic coil 119 in the yoke. The first clutch 117 is configured by the first armature 167, the first armature hub 153 and the first field 151. In addition, the plate spring portion 165 may be integrally formed to the main body portion 164 of the first rotor or may be fixed to the main body portion 164 of the first rotor that is separately provided.

An engagement groove (casing side engagement portion) 169 and an engagement piece 170 that is locked and engaged with the groove, which are described below, are disposed so as to be fixed to a predetermined place of the middle portion in the radial direction of the other side surface 168 opposite to the second opposite surface 166 of the plate spring portion 165 (left surface shown in FIGS. 8 and 9).

In addition, an annular plate-like engagement plate (fixing member) 171 that encloses the main shaft portion 114 of the first transmission shaft 110 and the man body portion 164 of the first rotor is provided at the side opposite to the second rotor 111 (left side shown in FIGS. 8 and 9) with respect to the annular plate-like plate spring portion 165. The engagement plate 171 is externally attached and fixed to the casing 107. For example, a plate that prevents pull-off from the casing 107 of the switching unit 106 may be used as the engagement plate 171. The engagement plate 171 includes an opposite surface 172 that is opposed to the other side surface 168 of the plate spring portion 165. The engagement groove 169 which is locked and engaged with the engagement piece 170 is formed on the opposite surface 172. The engagement grooves 169 are formed at a plurality of positions (for example, three positions) in the circumferential direction of the engagement plate 171. As described above, since the shift select shaft 101 reciprocates in the axial direction according to the rotation of the first rotor 112, the rotation posture of the first rotor 112 is in association with the position in the axial direction of the shift select shaft 101. The formation position of the engagement groove 169 is set to a position in which the engagement groove is engaged with the engagement piece 170 of the first rotor 112 when the shift select shift select shaft 101 is predetermined select positions (three positions). Thereby, any one of the engagement grooves 169 is locked and engaged with the engagement piece 170. Therefore, the first rotor 112 is connected to the casing 107. In the connection state of the first rotor 112 and the casing 107, the first rotor 112 is held by the casing 107 and cannot be rotated.

In the non-excitation state of the first electromagnetic coil 119 (refer to FIG. 8), the engagement piece 170 enters the engagement groove 169, and the engagement piece 170 and the engagement groove 169 are locked and engaged with each other.

On the other hand, in the excitation sate of the first electromagnetic coil 119 (refer to FIG. 9), the first armature 167 is attracted to the first field 151 that includes the first electromagnetic coil 119, the first armature 167 is moved toward the side of the second rotor 111 (right side shown in FIGS. 8 and 9), and the first armature 167 is frictionally engaged with the first armature hub 153. At this time, the circumferential edge portion of the plate spring portion 165 is elastically deformed so as to approach the side of the first field 151. According to the elastic deformation of the plate spring portion 165, the engagement piece 170 is moved toward the direction separated from the engagement groove 169 (right side shown in FIGS. 8 and 9), and thereby, the lock-engagement between the engagement piece 170 and the engagement groove 169 is released.

The second rotor 111 is coaxially and rotatably supported to the output shaft 109 of the electric motor 103 via the rolling bearing 160 and the annular second field 159. The second rotor 111 includes a main body portion 161 of the second rotor, and the second armature hub 156 that is provided at the end of the side of the first transmission shaft 110 in the second rotor 111, has a larger diameter than that of the main body portion 161 of the second rotor, and has a discoid shape. A step portion 162 for locking the outer ring of the rolling bearing 160 is formed on the side opposite to the first transmission shaft 110 with respect to the second armature hub 156 in the outer circumference of the main body portion 161 of the second rotor. The second field 159 that is externally fitted to the rolling bearing 160 is disposed so as to be adjacent to the second armature hub 156. That is, the second armature hub 156 is interposed between the second armature 158 and the second field 159.

The second field 159 houses the second electromagnetic coil 118 in the yoke. The second clutch 116 is configured by the second armature 158, the second armature hub 156, and the second field 159.

When the first transmission shaft 110 and the second rotor 111 are connected to each other (refer to FIG. 8), the second clutch 116 is in a connection state and the first clutch 117 is in a release state. At this time, the second electromagnetic coil 118 is in an excitation state, and the first electromagnetic coil 119 is in a non-excitation state. In this state, the second armature 158 is attracted to the second field 159, and the second armature 158 is frictionally engaged with the second armature hub 156. Thereby, the engagement between the second armature 158 and the first transmission shaft 110 is achieved, and the second rotor 111 is connected to the first transmission shaft 110. In addition, since the first electromagnetic coil 119 is in a non-excitation state, the engagement piece 170 and the engagement groove 169 are locked and engaged with each other, the first rotor 112 is connected to the casing 107, and the first rotor cannot be rotated.

Moreover, the first transmission shaft 110 and the second rotor 111 are integrally rotated, and the rotating torque of the first transmission shaft 110 is transmitted to the second rotor 111. If the rotating torque from the electric motor 103 is applied to the second rotor 111, the screw shaft 125 is rotated according to the rotation of the second rotor 111, and the nut 123 that is mounted on the screw shaft 125 is moved in the axial direction. Moreover, according to the movement in the axial direction of the nut 123, the connection rod 124 swings around the center axis line C3 of the shift select shaft 101. Since the second portion 135 of the connection rod 124 is provided so as to be not relatively rotated to the shift select shaft 101, the shift select shaft 101 is rotated around the center axis line C3 according to the swing of the connection rod 124.

When the first transmission shaft 110 and the first rotor 112 are connected to each other (refer to FIG. 9), the first clutch 117 is in a connection state and the first electromagnetic clutch 116 is in a release state. At this time, the first electromagnetic coil 119 is in an excitation state, and the second electromagnetic coil 118 is in a non-excitation state. In this state, as described above, the first armature 167 is frictionally engaged with the first armature hub 153, and the lock-engagement between the engagement piece 170 and the engagement groove 169 is released. Moreover, the first transmission shaft 110 and the first rotor 112 are integrally rotated, and the rotating torque of the first transmission shaft 110 is transmitted to the first rotor 112. The rotating torque from the electric motor 103 that is applied to the first rotor 112 is applied to the pinion 143 via the first gear 120, the second gear 142, and the second transmission shaft 141. Moreover, due to the engagement between the rack teeth 132 and the pinion 143, the shift select shaft 101 is moved in the axial direction Y2 according to the rotation of the pinion 143. Thereby, the rotating torque of the electric motor 103 is converted into a moving force in the axial direction Y2 of the shift select shaft 101.

As described above, according to this embodiment, in the connection state of the second rotor 111 and the first transmission shaft 110, the first rotor 112 is connected to the casing 107. In the connection state of the first rotor 112 and the casing 107, the first rotor 112 cannot be rotated. Therefore, when there is reverse input in the first rotor 112 that is released from the first transmission shaft 110, the movement in the axial direction of the shift select shaft 101 can be prevented.

Moreover, the connection/release with respect to the casing 107 of the first rotor 112 is performed using the first electromagnetic coil 119 of the first clutch 117. Therefore, it is not necessary to provide a dedicated magnetic circuit for performing the connection/release of the first rotor 112 to the casing 107, and thereby, reduction in the costs can be improved.

In addition, the engagement piece 170 is provided so as to be integrally moved with the first armature 167. Therefore, it not necessary to separately provide a member for connecting the first armature to the casing 107, and the reduction in the costs can be further improved.

In addition, as shown in a broken line in FIG. 6, in the mounting of the electrical actuator 102 on a vehicle, if the shift select shaft 101 extends in the up and down directions (vertical direction or direction near to the vertical direction), the downward force (downward direction force) due to the itself weight of the shift select shaft 101 acts on the shift select shaft, the rotating force based on the itself weight of the shift select shaft 101 acts on the first rotor 112 via the pinion 143, the second transmission shaft 141, and the first and second gears 120 and 142. When the first transmission shaft 110 and the first roller 112 are connected to each other, the shift select shaft 101 does not lower (is not moved in the axial direction) due to itself weight. However, when the first transmission shaft 110 and the first rotor 112 are in a release state, the first rotor 112 receives the rotating force based on the itself weight of the shift select shaft 101 and is rotated, and as a result, there is a concern that the lowering of the shift select shaft 101 may be admitted.

On the other hand, in this embodiment, when the second rotor 111 is connected to the first transmission shaft 110, the first rotor 112 is connected to the casing 107. Thereby, the first rotor 112 is not rotated. Thereby, in the release state of the first transmission shaft 110 and the second rotor 111, the lowering of the shift select shaft 101 can be reliably prevented.

As described above, two embodiments of the present invention are described. However, another embodiment of the present invention may be performed.

For example, in the second embodiment, the case where the engagement groove 169 is used as an engagement recess is described as an example. However, an engagement hole (through-hole that penetrates the plate spring portion 165) may be adopted as the engagement recess. In addition, the configuration is described as an example in which the engagement piece 170 is adopted as the first engagement portion and the engagement recess is adopted as the casing side engagement portion. However, a configuration may be applied in which the engagement recess is adopted as the first engagement portion and the engagement piece 170 is adopted as the casing side engagement portion.

In the first embodiment, the engagement rings 58 and 73 are not a portion of the casing 5 and may be externally attached and fixed to casing 5. Moreover, in the second embodiment, the engagement plate 171 is not externally attached and fixed to the casing 107 and may be configured as a portion of the casing 107.

In addition, in the second embodiment, the shape of the engagement plate 171 is not limited to the annular plate shape. Moreover, a plurality of plates in which the engagement groove 169 is formed respectively may be combined and configured.

In addition, in the first embodiment, the connection state between the rotors 31 and 32 and the casing 5 may be realized by the lock-engagement (mesh) like the second embodiment.

Moreover, in the second embodiment, the connection state between the first rotor 112 and the casing 107 may be realized by the frictional engagement like the first embodiment.

In addition, in the second embodiment, the configuration is described as an example which connects the first rotor 112 for moving (performs the select operation) the shift select shaft 101 in the axial direction and the casing 107. However, instead of this, a configuration may be adopted which connects the second rotor 111 for rotating (performs the shift operation) the shift select shaft 101 and the casing 107. Moreover, both of the configuration which connects the first rotor 112 and the casing 107 and the configuration which connects the second rotor 111 and the casing 107 may be adopted.

In addition, various design modifications may be applied within a range of matters described in claims.

INDUSTRIAL APPLICABILITY

According to the present invention, in the transmission driving device, it is possible to prevent the displacement of the shift operation member or the select operation member in a case where there is the reverse input in the shift operation member or the select operation member by inhibiting rotation of the rotation member which is released from the input shaft.

REFERENCE SIGNS LIST

1: transmission driving device
5: casing

8: shift shaft (shift operation member)
12: select shaft (select operation member)
9: electric motor
30: input shaft
31: first rotor (first rotation member)
32: second rotor (second rotation member)
33: clutch mechanism
34: first clutch
35: second clutch
36: first electromagnetic coil
37: second electromagnetic coil
55: first magnetic ring
56: fourth facing (first engagement portion and frictional portion)
60: fifth facing (casing side engagement portion)
70: second magnetic ring
71: seventh facing
75: eighth facing (casing side engagement portion)
100: transmission driving device
101: shift select shaft (shift operation member and select operation member)
103: electric motor
107: casing
110: first transmission shaft (input shaft)
111: second rotor (second rotation member)
112: first rotor (first rotation member)
113: clutch mechanism
116: second clutch
117: first clutch
119: first electromagnetic coil
167: first armature
169: engagement groove (casing side engagement portion)
170: engagement piece
171: engagement ring (fixing member)

The invention claimed is:

1. A transmission driving device comprising:
a casing;
a shift operation member which is configured to perform a shift operation;
a select operation member which is configured to perform a select operation;
an input shaft to which a rotating torque of an electric motor is to be input;
a first rotation member which is configured to transmit the rotating torque to one of the shift operation member and the select operation member;
a second rotation member which is configured to transmit the rotating torque to the other of the shift operation member and the select operation member;
a clutch mechanism configured to selectively transmit the rotating torque of the input shaft to the first rotation member or the second rotation member, the clutch mechanism including: a first clutch that is configured to connect the first rotation member to the input shaft and that is configured to release the first rotation member from the input shaft; and a second clutch that is configured to connect the second rotation member to the input shaft and that is configured to release the second rotation member from the input shaft;
a casing side engagement portion which is provided on the casing or which is provided on a fixing member that is provided to be fixed to the casing; and
a first engagement portion which is integrally and rotatably provided in the first rotation member, and which is provided so as to be capable of engaging with the casing side engagement portion, wherein
the first clutch is configured of an electromagnetic clutch that includes a first electromagnetic coil, and
the first engagement portion is attracted to a side of the first electromagnetic coil and the first engagement portion is engaged with the casing side engagement portion in a non-excitation state of the first electromagnetic coil in the first clutch, and an engagement between the first engagement portion and the casing side engagement portion is released in an excitation state of the first electromagnetic coil.

2. The transmission driving device according to claim 1, further comprising a magnetic ring which is provided so as to be integrally rotated with the first rotation member and which is disposed so as to be moved in an axial direction between the first electromagnetic coil and the casing side engagement portion, wherein
the first engagement portion is provided so as to be integrally moved with the magnetic ring.

3. The transmission driving device according to claim 2, wherein
the first engagement portion includes a frictional portion that is frictionally engaged with the casing side engagement portion.

4. The transmission driving device according to claim 2, wherein
the first engagement portion includes an engagement piece or an engagement recess that is locked and engaged with the casing side engagement portion.

5. The transmission driving device according to claim 1, wherein
the first clutch further includes an armature that is provided so as to be integrally rotated with the first rotation member between the first electromagnetic coil and the casing side engagement portion,
in the excitation state of the first electromagnetic coil, the armature is attracted to the side of the first electromagnetic coil, the armature is engaged with the input shaft, and thereby, the first rotation member and the input shaft are connected to each other, and, in the non-excitation state of the first electromagnetic coil, an engagement between the armature and the first rotation member is released, and thereby, the first rotation member is released from the input shaft, and
the first engagement portion is provided so as to integrally be moved with the armature.

6. The transmission driving device according to claim 5, wherein
the first engagement portion includes a frictional portion that is frictionally engaged with the casing side engagement portion.

7. The transmission driving device according to claim 5, wherein
the first engagement portion includes an engagement piece or an engagement recess that is locked and engaged with the casing side engagement portion.

8. The transmission driving device according to claim 1, wherein
the first engagement portion includes a frictional portion that is frictionally engaged with the casing side engagement portion.

9. The transmission driving device according to claim 1, wherein
the first engagement portion includes an engagement piece or an engagement recess that is locked and engaged with the casing side engagement portion.

10. The transmission driving device according to claim 1, further comprising a second engagement portion that can be engaged with the casing side engagement portion, wherein the second clutch is configured of an electromagnetic clutch that includes a second electromagnetic coil, the second engagement portion is attracted to a side of the second electromagnetic coil and the second engagement portion is engaged with the casing side engagement portion in a non-excitation state of the second electromagnetic coil in the second clutch, and an engagement between the second engagement portion and the casing side engagement portion is released in an excitation state of the second electromagnetic coil.

* * * * *